United States Patent
Yajima et al.

(10) Patent No.: US 10,049,695 B2
(45) Date of Patent: Aug. 14, 2018

(54) OPTICAL PICKUP DEVICE AND OPTICAL DRIVE DEVICE

(71) Applicant: Panasonic Intellectual Property Management Co., Ltd., Osaka (JP)

(72) Inventors: Masatoshi Yajima, Osaka (JP); Kazuyoshi Kajita, Osaka (JP); Masahiko Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/509,960

(22) PCT Filed: Dec. 21, 2015

(86) PCT No.: PCT/JP2015/006348
§ 371 (c)(1),
(2) Date: Mar. 9, 2017

(87) PCT Pub. No.: WO2016/120939
PCT Pub. Date: Aug. 4, 2016

(65) Prior Publication Data
US 2017/0301369 A1    Oct. 19, 2017

(30) Foreign Application Priority Data
Jan. 30, 2015 (JP) .................. 2015-017847

(51) Int. Cl.
*G11B 7/00* (2006.01)
*G11B 7/127* (2012.01)
(Continued)

(52) U.S. Cl.
CPC ............ *G11B 7/127* (2013.01); *G02B 6/2848* (2013.01); *G11B 7/1367* (2013.01); *G02B 6/3526* (2013.01); *G11B 2007/0006* (2013.01)

(58) Field of Classification Search
CPC ... G11B 7/1374; G11B 7/0935; G11B 7/0933; G11B 7/0932; G11B 7/1353; G11B 7/131
(Continued)

(56) References Cited

U.S. PATENT DOCUMENTS 8,369,193 B2 *  2/2013  Kawasaki ............ G11B 7/1374
                                                      369/112.24
2008/0068960 A1   3/2008  Hosoda et al.
(Continued)

FOREIGN PATENT DOCUMENTS

JP    2012-226816     11/2012
WO    2008/114231 A1  9/2008

OTHER PUBLICATIONS

International Search Report of PCT application No. PCT/JP2015/006348 dated Mar. 22, 2016.
(Continued)

*Primary Examiner* — Nabil Hindi
(74) *Attorney, Agent, or Firm* — McDermott Will & Emery LLP

(57) ABSTRACT

An optical pickup device includes a semiconductor laser that emits a laser beam, and an object lens that concentrates the laser beam emitted from the semiconductor laser on an optical disc. In this optical pickup device, an optical axis of the object lens is inclined with respect to an optical axis of the laser beam that is incident on the object lens so as to generate flares caused by coma aberration on an entrance side in a forward direction of pits of the optical disc.

6 Claims, 13 Drawing Sheets

(51) Int. Cl.
*G11B 7/1367* (2012.01)
*G02B 6/28* (2006.01)
*G02B 6/35* (2006.01)

(58) Field of Classification Search
USPC ...... 369/112.24, 44.23, 44.14, 44.32, 110.03
See application file for complete search history.

(56) References Cited

U.S. PATENT DOCUMENTS

2008/0088954 A1    4/2008  Takahashi
2010/0271927 A1*  10/2010  Furuichi ............ G11B 7/08582
                                                    369/112.24
2011/0182167 A1    7/2011  Ogata et al.
2011/0255392 A1*  10/2011  Kano .................... G11B 7/082
                                                    369/112.24

OTHER PUBLICATIONS

The Extended European Search Report dated Jan. 5, 2018 for the related European Patent Application No. 15879838.9.

* cited by examiner

FIG. 9
Before transmission
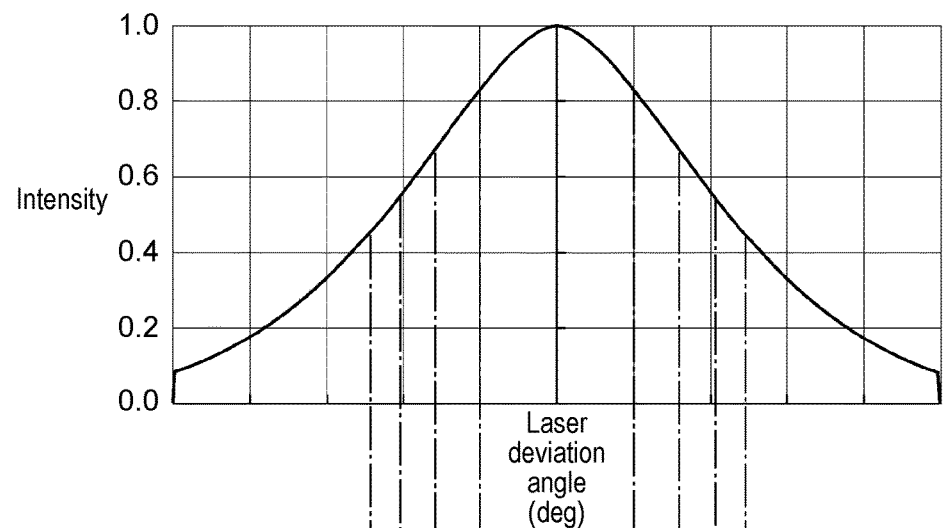
After transmission
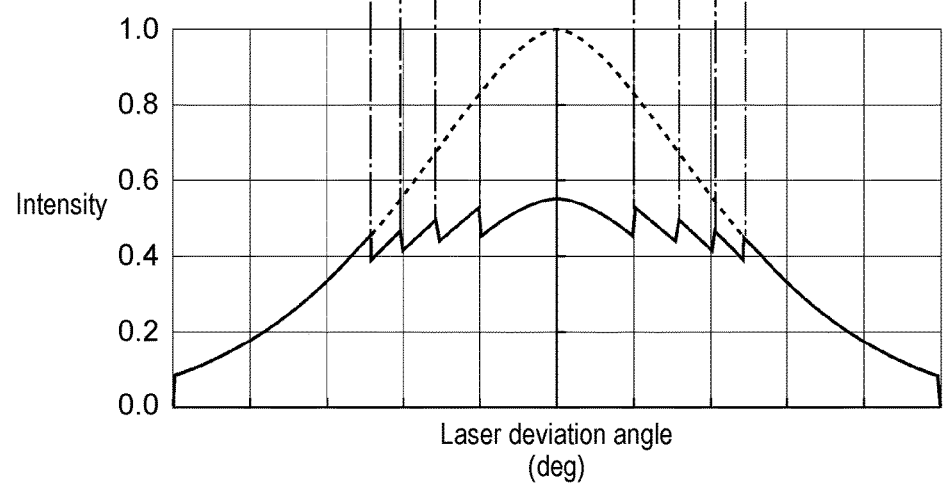

OPTICAL PICKUP DEVICE AND OPTICAL DRIVE DEVICE

This application is a U.S. national stage application of the PCT International Application No. PCT/JP2015/006348 filed on Dec. 21, 2015, which claims the benefit of foreign priority of Japanese patent application 2015-017847 filed on Jan. 30, 2015, the contents all of which are incorporated herein by reference.

TECHNICAL FIELD

The present disclosure relates to an optical pickup device and an optical drive device equipped with the optical pickup device.

BACKGROUND ART

A Blu-ray (registered trademark) Disc (hereinafter also referred to as "BD") on which information is recorded with high density compared with a Digital Versatile Disc (DVD) and a Compact Disc (CD) is known. Patent Literature 1 discloses an optical pickup device that supports not only DVD and CD but also such a BD.

An Ultra High Definition (UHD) BD, which is a triple-layer structure BD, has been proposed. Such a BD has structure in which an L2 layer is further added to a conventional double-layer structure BD that has an L0 layer and an L1 layer.

In the triple-layer structure BD, improvement in playback performance in the L2 layer (jitter) is desired.

CITATION LIST

Patent Literature

PTL 1: Unexamined Japanese Patent Publication No. 2012-226816

SUMMARY

The present disclosure provides an optical pickup device and optical drive device that allow improvement in the playback performance in the L2 layer at a time of playback of the triple-layer structure BD.

An optical pickup device according to the present disclosure includes a semiconductor laser that emits a laser beam and an object lens that concentrates the laser beam on an optical disc. Also, in this optical pickup device, an optical axis of the object lens is inclined with respect to an optical axis of the laser beam that is incident on the object lens so as to generate flares caused by coma aberration on an entrance side in a forward direction of pits of the optical disc.

The optical pickup device according to the present disclosure allows improvement in the playback performance in the L2 layer at the time of playback of the triple-layer structure BD.

BRIEF DESCRIPTION OF DRAWINGS

FIG. 9 is a diagram illustrating one example of correction of intensity distribution of a laser beam according to the first exemplary embodiment.

DESCRIPTION OF EMBODIMENTS

Figure 1:
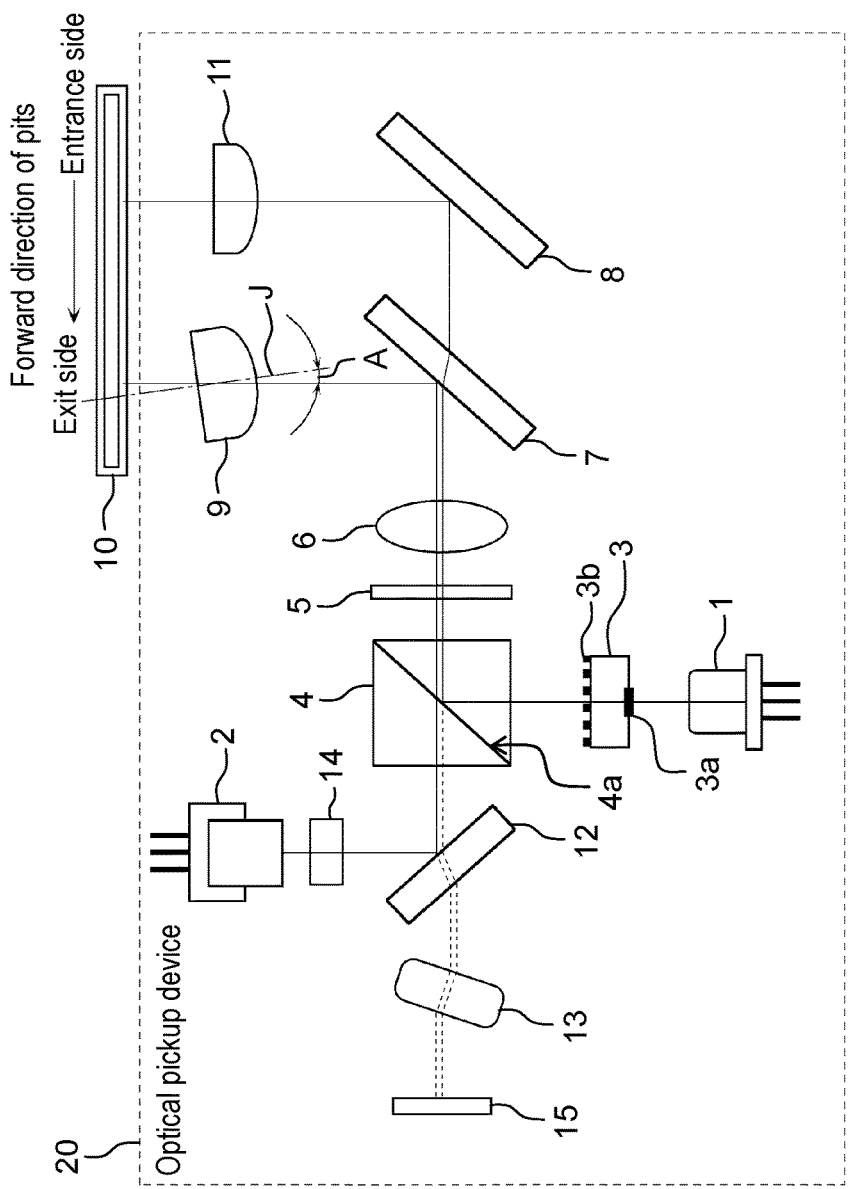
FIG. 1 is a diagram schematically illustrating one example of an optical configuration of an optical pickup device according to the first exemplary embodiment.

Exemplary embodiments will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiments.

It is to be noted that the accompanying drawings and the following description are provided in order for a person skilled in the art to fully understand the present disclosure, and are not intended to limit the subject described in the appended claims.

Also, each diagram is a schematic view and is not necessarily illustrated strictly. In addition, in each diagram, identical reference numerals are assigned to substantially identical components, and duplicate description may be omitted or simplified.

In addition, in the following exemplary embodiments, a direction of a tangential line of an optical disc is described as a tangential direction (alternatively, forward direction of pits, jitter direction), whereas a direction of a radius of the optical disc is described as a radial direction. The tangential direction and radial direction are directions orthogonal to each other. Also, in the following exemplary embodiments, a direction corresponding to the tangential direction in each optical member that constitutes an optical pickup is also simply described as the "tangential direction." Similarly, a direction corresponding to the radial direction in each optical member is also simply described as the "radial direction."

First Exemplary Embodiment

[1-1. Optical Configuration of Optical Pickup Device]

First, an optical configuration (optical system) of an optical pickup device according to the first exemplary embodiment will be described.

FIG. 1 is a diagram schematically illustrating one example of an optical configuration of an optical pickup device according to the first exemplary embodiment. It is to be noted that FIG. 1 mainly illustrates components of the optical system, and omits components of an electric system.

Optical pickup device 20 according to the first exemplary embodiment includes semiconductor laser 1, diffraction element 3, beam splitter 4, wave plate 5, collimator lens 6, mirror 7, object lens 9, detection lens 13, and light-receiving element 15. In addition, optical pickup device 20 includes semiconductor laser 2, diffraction element 14, beam splitter 12, mirror 8, and object lens 11. It is to be noted that FIG. 1 also illustrates optical disc 10. Optical disc 10 is a BD or a DVD.

Semiconductor laser 1 is a laser that emits a blue-violet laser beam to read data recorded on a BD (hereinafter also referred to as "playback of a BD"). Semiconductor laser 1 is configured to emit the laser beam that contains light of p-polarized light as a main component. An oscillation wavelength (central wavelength of oscillation) of semiconductor laser 1 is 405 nm, for example.

Diffraction element 3 is a diffraction element provided on an optical path between semiconductor laser 1 and object lens 9. A first principal plane of diffraction element 3 is provided with first diffraction grating 3a with duty to be described later becoming smaller from a central portion toward an outer edge. First diffraction grating 3a is a diffraction grating for correcting intensity distribution of the laser beam emitted from semiconductor laser 1 so as to reduce a shape of an optical spot formed by object lens 9 on optical disc 10. It is to be noted that the first principal plane of diffraction element 3 refers to a surface of diffraction element 3 on a side facing semiconductor laser 1. Details of first diffraction grating 3a will be described later.

A second principal plane of diffraction element 3 on an opposite side of the first principal plane is provided with second diffraction grating 3b for dividing the laser beam emitted from semiconductor laser 1 into at least three beams and causing the divided beams to be incident on object lens 9. Second diffraction grating 3b is a so-called diffraction grating for three-beam formation, and is substantially identical to what is used for general optical pickup devices.

Beam splitter 4 is an optical element (polarization beam splitter) that includes separating plane 4a and separates light incident on separating plane 4a according to a polarization direction. In the first exemplary embodiment, beam splitter 4 is configured to cause separating plane 4a to reflect light of p-polarized light and transmit light of s-polarized light. It is to be noted that beam splitter 4, which is cube-shaped, may be plate-shaped.

Wave plate 5 is a so-called ¼ wave plate, and is a birefringent element that provides a ¼-wavelength phase difference between orthogonal polarization components (for example, p-polarized light component and s-polarized light component).

Collimator lens 6 is a lens that collimates (parallelizes) and emits light incident on collimator lens 6.

Mirror 7 is a mirror that reflects the laser beam that is emitted from semiconductor laser 1 and collimated by collimator lens 6, and guides the laser beam to object lens 9. It is to be noted that mirror 7 has wavelength selectivity, and is configured to reflect the laser beam emitted from semiconductor laser 1 (for example, light with a wavelength near 405 nm), but to transmit the laser beam emitted from semiconductor laser 2 (for example, light with a wavelength near 660 nm).

Object lens 9 is a lens that concentrates the laser beam reflected by mirror 7 (laser beam emitted from semiconductor laser 1) on optical disc 10. By object lens 9 concentrating the laser beam, an optical spot is formed on an information recording surface of optical disc 10. A design base material thickness (optimal light concentrating position) of object lens 9 is a position of 87.5 μm from a lower surface of optical disc 10 (lower end surface of optical disc 10 facing optical pickup device 20). It is to be noted that object lens 9 is supported by an actuator (not illustrated) for driving object lens 9 in a focus direction and tracking direction.

Object lens 9 is disposed at an inclination with respect to an optical axis of the laser beam incident on object lens 9 (incident direction of the laser beam on object lens 9). Specifically, optical axis J of object lens 9 is inclined at a predetermined angle with respect to the optical axis of the laser beam immediately before the laser beam is incident on object lens 9 (angle A illustrated in FIG. 1) so as to generate flares caused by coma aberration on an entrance side (entering side) of pits in a forward direction of pits of optical disc 10. In other words, in a state where optical disc 10 is disposed substantially perpendicularly to the optical axis of the laser beam incident on object lens 9, a space between the lower surface of optical disc 10 and an emission surface of object lens 9 (fringe section of the emission surface) in the forward direction of pits is larger (wider) on an exit side (downstream side) of pits than on the entrance side (upstream side) of pits. Details of disposition of object lens 9 will be described later.

Detection lens 13 is a lens that guides the laser beam reflected by optical disc 10 to light-receiving element 15.

Light-receiving element 15 is an element that receives the laser beam reflected by optical disc 10 and outputs an electric signal according to the received light. Light-receiving element 15 specifically includes a conversion element (photodetector) that converts the received light into an electric signal, and an amplifier circuit that amplifies the signal converted by the conversion element.

Semiconductor laser 2 is a laser that emits a red laser beam for reading data recorded on a DVD (hereinafter also referred to as "playback of a DVD"). Semiconductor laser 2 is configured to emit the laser beam that contains light of p-polarized light as a main component. An oscillation wavelength of semiconductor laser 2 is 660 nm, for example.

Diffraction element 14 is a so-called diffraction element for three-beam formation, and is substantially identical to what is used for general optical pickup devices.

Beam splitter 12 is an optical element that separates light according to a polarization direction (polarization beam splitter). In the first exemplary embodiment, beam splitter 12 is configured to reflect light of p-polarized light and to transmit light of s-polarized light. It is to be noted that beam splitter 12, which is plate-shaped, may be cube-shaped.

Mirror 8 is a mirror that guides to object lens 11 the laser beam that is emitted from semiconductor laser 2, is collimated by collimator lens 6, and passes through mirror 7.

Object lens 11 is a lens that concentrates the laser beam reflected by mirror 8 (laser beam emitted from semiconductor laser 2) on optical disc 10.

[1-2. Operation of Optical Pickup Device]

Next, an operation of optical pickup device 20 will be described. First, an operation at a time of playback of a BD will be described.

At the time of playback of a BD, the laser beam is emitted from semiconductor laser 1. It is to be noted that the laser beam emitted from semiconductor laser 1 contains light of p-polarized light as a main component, as described above. The laser beam emitted from semiconductor laser 1 undergoes correction of the intensity distribution performed by first diffraction grating 3a of diffraction element 3, and is then incident on second diffraction grating 3b.

After passing through second diffraction grating 3b, the laser beam emitted from semiconductor laser 1 is divided into three beams. The divided laser beams, which contain light of p-polarized light as a main component as described above, are reflected by beam splitter 4, pass through wave plate 5, and are incident on collimator lens 6.

The laser beams that have become generally parallel beams by collimator lens 6 are reflected by mirror 7 and incident on object lens 9. The laser beams that are incident on object lens 9 are concentrated by object lens 9 on the information recording surface of optical disc 10, and then form the optical spot.

The laser beams reflected by the information recording surface of optical disc 10 are reflected by mirror 7 and pass through collimator lens 6 and wave plate 5. Here, the laser beams that are incident on beam splitter 4 go up and down the optical path that passes through wave plate 5 once, and pass through wave plate 5 twice. Accordingly, the laser beams are ½ wavelength out of phase with respect to the laser beam emitted from semiconductor laser 1, and contain light of s-polarized light as a main component. Therefore, the laser beams that are incident on beam splitter 4 pass through beam splitter 4, and then pass through beam splitter 12 as well. Then, the laser beams that pass through beam splitter 12 are incident on light-receiving element 15 by detection lens 13.

The laser beams that are incident on light-receiving element 15 are converted into an electric signal by the conversion element and amplifier circuit included in light-receiving element 15. Then, the electric signal is output from light-receiving element 15.

Next, the operation at the time of playback of a DVD will be described.

At the time of playback of a DVD, the laser beam is emitted from semiconductor laser 2. It is to be noted that the laser beam emitted from semiconductor laser 2 contains light of p-polarized light as a main component, as described above. After passing through diffraction element 14, the laser beam emitted from semiconductor laser 2 is divided into three beams. The divided laser beams, which contain light of p-polarized light as a main component as described above, are reflected by beam splitter 12, pass through beam splitter 4 and wave plate 5, and are incident on collimator lens 6.

The laser beams that have become generally parallel beams by collimator lens 6 pass through mirror 7, are reflected by mirror 8, and are incident on object lens 11. The laser beams that are incident on object lens 11 are concentrated by object lens 11 on the information recording surface of optical disc 10, and form the optical spot.

The laser beams reflected by the information recording surface of optical disc 10 are reflected by mirror 8 and pass through mirror 7, collimator lens 6, and wave plate 5. Subsequent operations are similar to the operations for playback of a BD, and thus description thereof will be omitted.

[1-3. Disposition of Object Lens]

In a general optical pickup device, an object lens is disposed so as to cause an optical axis of the object lens to substantially coincide with (to become generally parallel with) an optical axis of a laser beam that is incident on the object lens. Meanwhile, in optical pickup device 20, as illustrated in FIG. 1, object lens 9 is disposed so as to cause optical axis J of object lens 9 to be inclined with respect to the optical axis of the laser beam that is incident on object lens 9. Such disposition of object lens 9 allows optical pickup device 20 to improve the playback performance in the L2 layer at the time of playback of a triple-layer structure BD (UHD BD).

First, structure of the triple-layer structure BD will be described (hereinafter, optical disc 10 will be described as the triple-layer structure BD).

Figure 2:
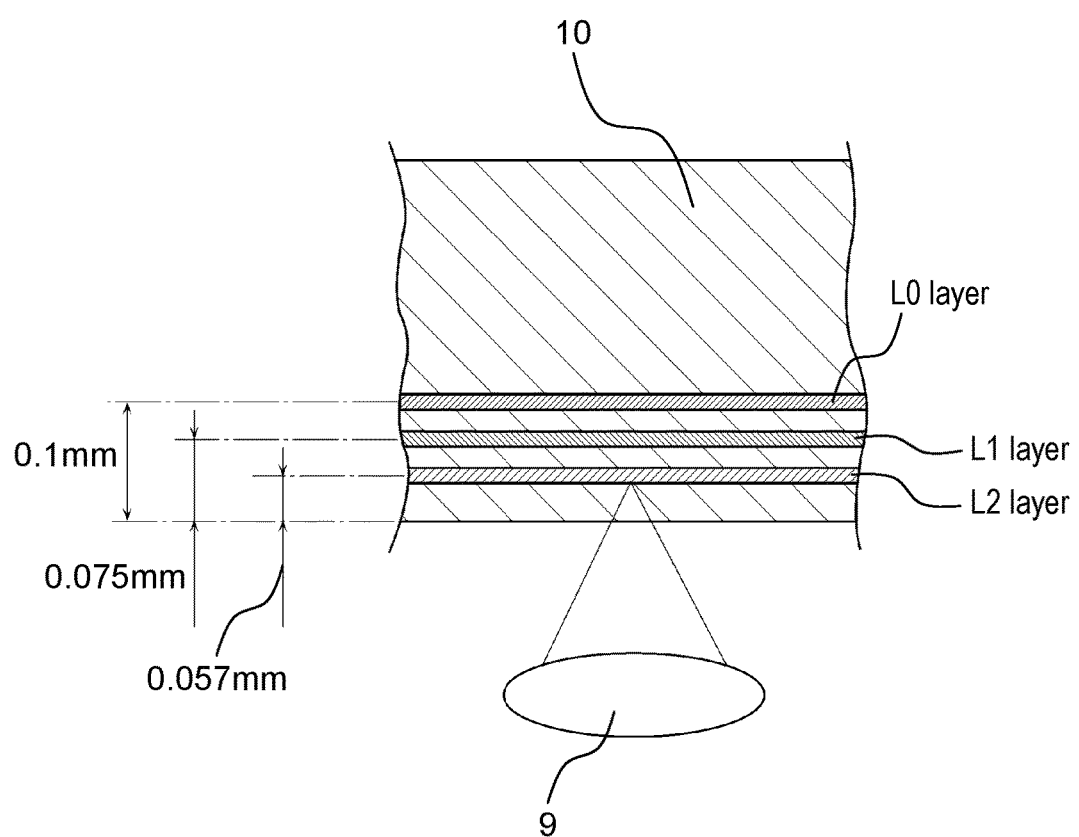
FIG. 2 is a cross-sectional view schematically illustrating layer structure of an optical disc.

FIG. 2 is a cross-sectional view schematically illustrating layer structure of optical disc 10.

First, in a conventional double-layer structure BD, an L0 layer is provided at a position of base material thickness of about 100 μm from the lower surface of optical disc 10 (surface of optical disc 10 facing object lens 9), and an L1 layer is provided at a position of base material thickness of about 75 m from the lower surface. Here, a recording capacity per layer is about 25 gigabytes.

It is to be noted that in the present exemplary embodiment, a distance from the lower surface of optical disc 10 to each recording layer (L0 layer, L1 layer, or L2 layer) is a distance from the lower surface to a reflecting surface of each recording layer. However, since thickness of each recording layer is extremely thin, about 2000 Å each, the distance from the lower surface to each recording layer in the following description may be the distance from the lower surface to a center of each recording layer.

In the triple-layer structure BD, in addition to the L0 layer and L1 layer, an L2 layer is provided at a position of base material thickness of about 57 μm from the lower surface.

Here, the inventors have found out that it is possible to improve the playback performance in the L2 layer at the time of playback of the triple-layer structure BD in optical pickup device 20 by positively generating coma aberration in the tangential direction.

Figure 3:
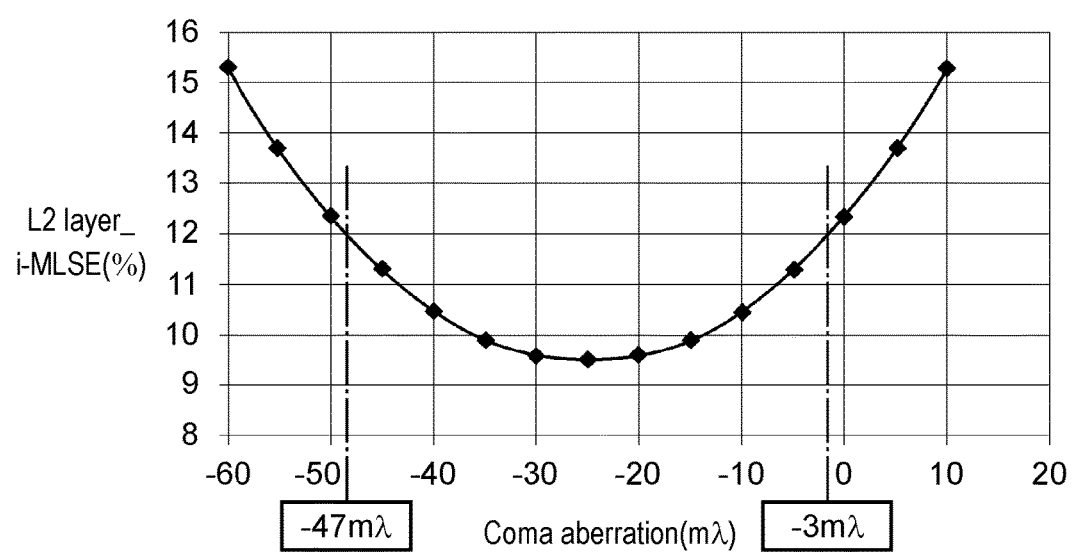
FIG. 3 is a diagram illustrating one example of a relationship between coma aberration in a tangential direction and playback performance in an L2 layer.

FIG. 3 is a diagram illustrating one example of a relationship between coma aberration in the tangential direction and the playback performance in the L2 layer.

In FIG. 3, a horizontal axis represents an amount of coma aberration (unit: mλ), whereas a vertical axis represents a value of Integrated-Maximum Likelihood Sequence Estimation (i-MLSE), which is an index of playback performance (unit: %). It is to be noted that the value of i-MLSE is an evaluation value of error rate correlation used for a playback system that employs a bit detection system based on Partial Response Maximum Likelihood (PRML).

As illustrated in FIG. 3, in the L2 layer, the value of i-MLSE becomes substantially smallest in a state where coma aberration of about −25 mλ occurs in the tangential direction. That is, according to an evaluation result illustrated in FIG. 3, it can be said that the playback performance in the L2-layer in optical pickup device 20 is best in the state where coma aberration of about −25 mλ occurs in the tangential direction. This is because the optical spot on optical disc 10 can be reduced in the tangential direction by positively generating coma aberration.

Here, polarity of coma aberration will be supplemented.

Figure 4:
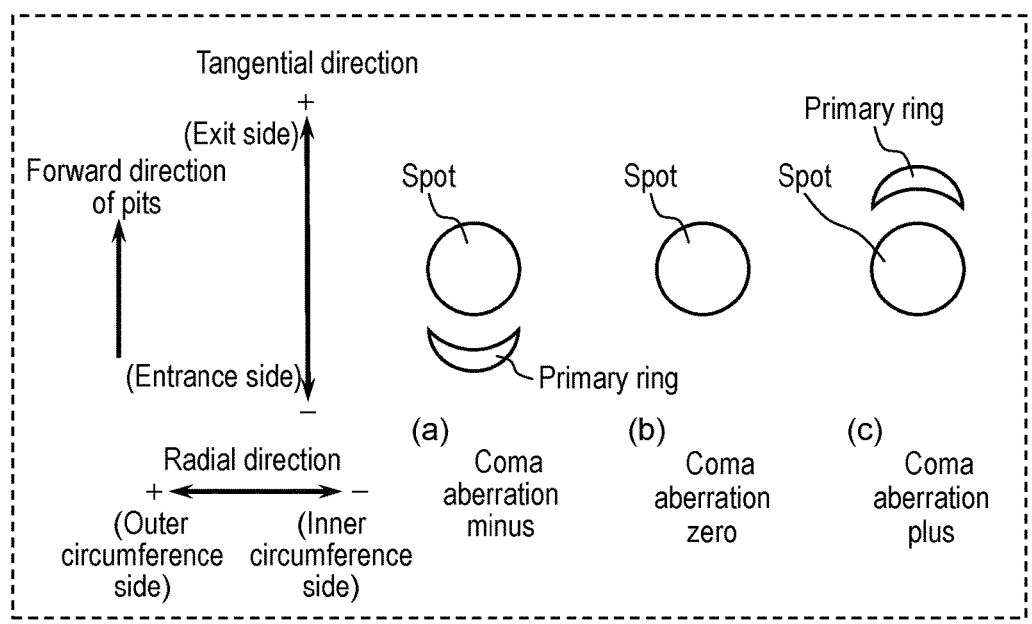
FIG. 4 is a schematic view for describing polarity of coma aberration.

FIG. 4 is a schematic view for describing the polarity of coma aberration.

In the first exemplary embodiment, coma aberration being minus (−) in the tangential direction means a state where a primary ring (flare) is generated on the entrance side of the forward direction of pits (refer to (a) of FIG. 4). Coma aberration being plus (+) in the tangential direction means a state where the primary ring (flare) is generated on the exit side of the forward direction of pits (refer to (c) of FIG. 4). It is to be noted that when coma aberration is 0 in the tangential direction, (substantially) almost no primary ring is generated (refer to (b) of FIG. 4).

As described above, in optical pickup device 20, optical axis J of object lens 9 is inclined with respect to the optical axis of the laser beam that is incident on object lens 9 so as to generate flares caused by coma aberration on the entrance side in the forward direction of pits of optical disc 10. That is, by disposing object lens 9 at an inclination with respect to the optical axis of the laser beam that is incident on object lens 9 intentionally, optical pickup device 20 positively generates minus coma aberration (refer to (a) of FIG. 4).

This allows optical pickup device 20 to improve the playback performance in the L2-layer at the time of playback of the triple-layer structure BD.

It is to be noted that in general, it is preferable that the value of i-MLSE be controlled to be 12% or less. According to the evaluation result illustrated in FIG. 3, when coma aberration is between −47 mλ and −3 mλ inclusive in the tangential direction, the value of i-MLSE will be 12% or less. That is, based on the evaluation result illustrated in FIG. 3, it is preferable that an amount of occurrence of coma aberration be between −47 mλ and −3 mλ inclusive. An inclination angle of object lens 9 (angle A illustrated in FIG. 1) for achieving such amount of occurrence of coma aberration will be described.

Figure 5:
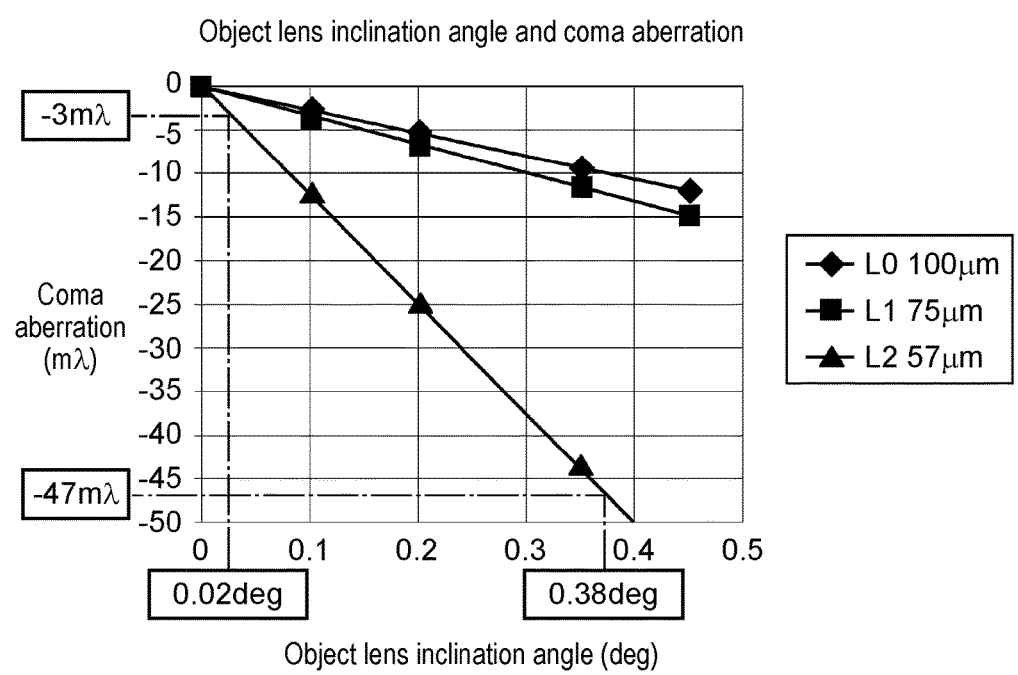
FIG. 5 is a diagram illustrating one example of a relationship between an inclination angle of an object lens and an amount of occurrence of coma aberration according to the first exemplary embodiment.

FIG. 5 is a diagram illustrating one example of a relationship between the inclination angle of object lens 9 and the amount of occurrence of coma aberration in the first exemplary embodiment.

In FIG. 5, a horizontal axis represents the inclination angle of optical axis J of object lens 9 with respect to the optical axis of the laser beam that is incident on object lens 9 (hereinafter referred to as just "inclination angle A of object lens 9", unit: deg), whereas a vertical axis represents the amount of coma aberration (unit: mλ).

As illustrated in FIG. 5, the amount of occurrence of coma aberration becomes between −47 mλ and −3 mλ inclusive when inclination angle A of object lens 9 is between 0.02 deg and 0.38 deg inclusive. It is to be noted that an optimum value of inclination angle A of object lens 9 is 0.20 deg corresponding to coma aberration of −25 mλ.

It is to be noted that FIG. 5 also illustrates the relationship between inclination angle A of object lens 9 and the amount of occurrence of coma aberration in each of the L0 layer and L1 layer.

It is a concern that causing object lens 9 to be inclined as described above worsens the value of i-MLSE in the L0 layer and L1 layer. However, as illustrated in FIG. 5, the amounts of change in coma aberration with respect to inclination angle A of object lens 9 in the L0 layer and L1 layer are smaller than the amount of change in coma aberration with respect to inclination angle A of object lens 9 in the L2 layer. That is, when object lens 9 is inclined, the amounts of coma aberration that occur in the L0 layer and L1 layer are smaller than the amount of coma aberration that occurs in the L2 layer. This is considered to result from an influence of the design base material thickness of object lens 9 (87.5 μm), and from the base material thickness from the lower surface of optical disc 10 to the L2 layer position (57 μm) being thin compared with the base material thickness from the lower surface of optical disc 10 to the positions of the L0 layer and L1 layer (100 μm and 75 μm, respectively).

Thus, the influence of the inclination of object lens 9 on the value of i-MLSE in the L0 layer and L1 layer is limited. Therefore, even if object lens 9 is inclined in optical pickup device 20 for improvement in the playback performance in the L2-layer, substantially no problem occurs.

[1-4. Effect of Disposition of Object Lens, Etc.]

As described above, in the present exemplary embodiment, an optical pickup device includes a semiconductor laser that emits a laser beam and an object lens that concentrates the laser beam on an optical disc. An optical axis of the object lens is inclined with respect to an optical axis of the laser beam that is incident on the object lens so as to generate flares caused by coma aberration on an entrance side in a forward direction of pits of the optical disc.

It is to be noted that optical pickup device 20 is one example of the optical pickup device. Semiconductor laser 1 is one example of the semiconductor laser. Object lens 9 is one example of the object lens. Optical disc 10 is one example of the optical disc. Optical axis J is one example of the optical axis of the object lens.

For example, in the configuration example of optical pickup device 20 described in the first exemplary embodiment, optical pickup device 20 includes semiconductor laser 1 that emits the laser beam, and object lens 9 that concentrates the laser beam emitted from semiconductor laser 1 on optical disc 10. Also, in optical pickup device 20, optical axis J of object lens 9 is inclined with respect to the optical axis of the laser beam that is incident on object lens 9 so as to generate flares caused by coma aberration on the entrance side in the forward direction of pits of optical disc 10.

This allows optical pickup device 20 to relatively reduce the optical spot on optical disc 10 formed by the laser beam emitted from semiconductor laser 1 in the tangential direction. Therefore, when optical disc 10 is the triple-layer structure BD, optical pickup device 20 can improve the playback performance in the L2 layer of optical disc 10.

In addition, optical pickup device 20 can be implemented by using optical design of conventional optical pickups and the like almost as it is, except for disposition of object lens 9. Accordingly, it is not necessary to newly perform design of optical pickup device 20, and almost no change is needed from production facilities for conventional optical pickup devices. That is, the configuration of optical pickup device 20 described in the present exemplary embodiment allows relatively easy achievement of improvement in the playback performance in the L2 layer of the triple-layer structure BD.

In the optical pickup device, an inclination angle of the optical axis of the object lens with respect to the optical axis of the laser beam that is incident on the object lens may be between 0.02 deg and 0.38 deg inclusive.

For example, in the configuration example of optical pickup device 20 described in the first exemplary embodiment, in optical pickup device 20, it is preferable that the inclination angle of optical axis J of object lens 9 with respect to the optical axis of the laser beam that is incident on object lens 9 is set between 0.02 deg and 0.38 deg inclusive.

Since this allows optical pickup device 20 to control the value of i-MLSE to be 12% or less, when optical disc 10 is the triple-layer structure BD, the playback performance in the L2 layer of optical disc 10 can be improved.

[1-5. Structure of Diffraction Element]

In the UHD BD, recording density per layer is relatively high. Accordingly, when optical disc 10 is the UHD BD, in order to obtain more stable playback performance in optical pickup device 20, it is preferable to minimize the optical spot formed by the laser beam emitted from semiconductor laser 1 on optical disc 10. Methods for reducing the optical spot include a method for increasing numerical aperture of object lens 9, a method for increasing magnification of the BD optical system, and the like. Optical pickup device 20 achieves reduction in the optical spot by using diffraction element 3.

The structure of diffraction element 3 will be described below.

Figure 6:
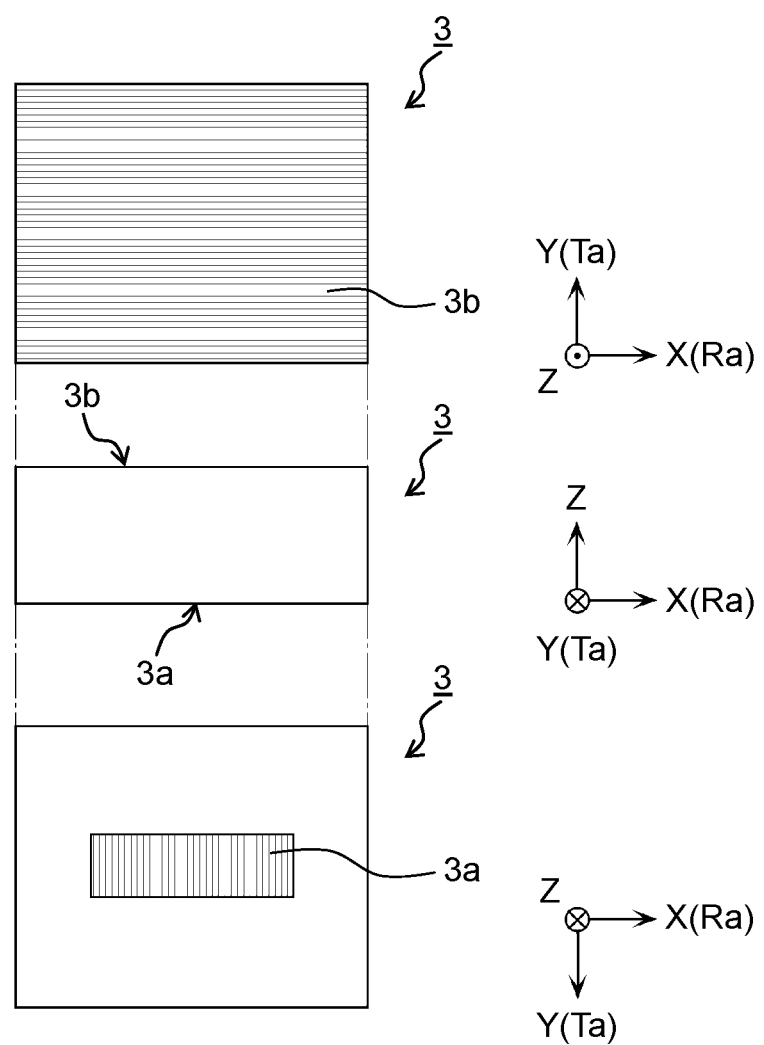
FIG. 6 is a schematic view illustrating one example of structure of a diffraction element according to the first exemplary embodiment.

FIG. 6 is a schematic view illustrating one example of the structure of diffraction element 3 according to the first exemplary embodiment. A figure in an upper section of FIG. 6 is a top view of diffraction element 3, a figure in a middle section of FIG. 6 is a side view of diffraction element 3, and a figure in a lower section of FIG. 6 is a bottom view of diffraction element 3.

It is to be noted that in FIG. 6, a lower surface of diffraction element 3 is a surface on which the laser beam emitted from semiconductor laser 1 is incident (surface facing semiconductor laser 1), and is one example of the first principal plane. An upper surface of diffraction element 3 is an emission surface of the laser beam in diffraction element 3 (surface facing beam splitter 4), and is one example of the second principal plane.

It is to be noted that the following description of the structure of diffraction element 3 uses XYZ axes as necessary. In the present exemplary embodiment, for convenience, it is assumed that a direction parallel to the radial direction is the X axis, a direction parallel to the tangential direction is the Y axis, and a direction orthogonal to both the X axis and the Y axis is the Z axis.

As illustrated in FIG. 6, first diffraction grating 3a is provided on the first principal plane of diffraction element 3, and second diffraction grating 3b for dividing the laser beam from semiconductor laser 1 into at least three beams and causing the divided three beams to be incident on object lens 9 is provided on the second principal plane of diffraction element 3 on an opposite side of the first principal plane.

In diffraction element 3, second diffraction grating 3b is a diffraction grating for three-beam formation used for general optical pickup devices. Meanwhile, first diffraction grating 3a is a diffraction grating for correcting the intensity distribution of the laser beam so as to reduce the shape of the optical spot to be formed by object lens 9 on optical disc 10.

First diffraction grating 3a is structured with the duty of the grating becoming smaller from a central portion toward an outer edge.

Figure 7:
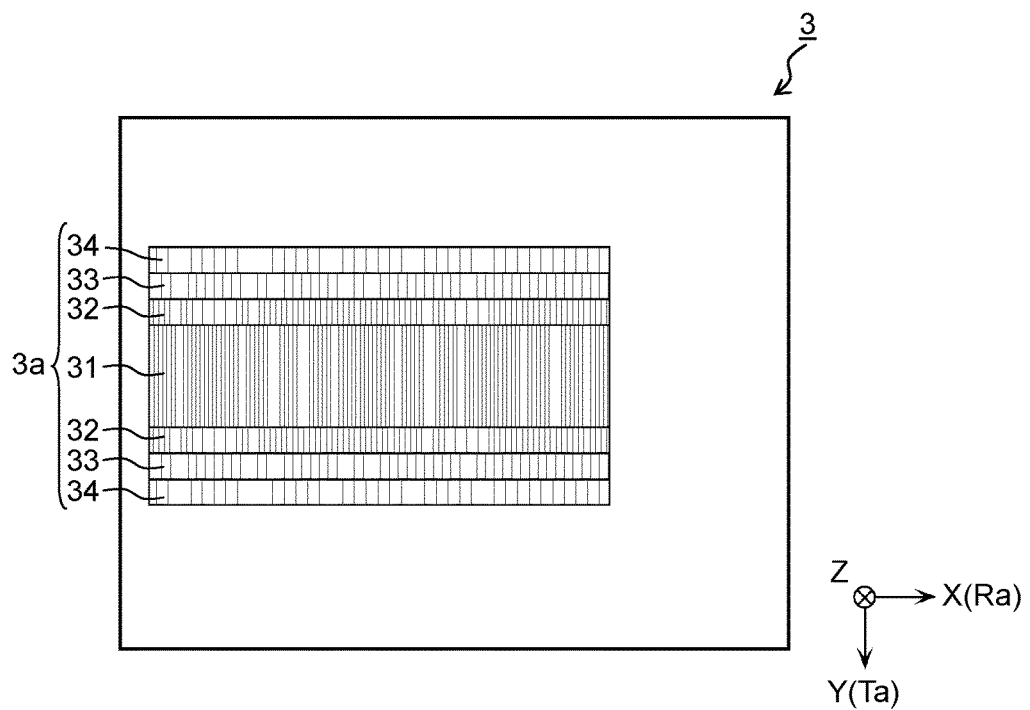
FIG. 7 is a diagram schematically illustrating one example of structure of a first diffraction grating according to the first exemplary embodiment.

FIG. 7 is a diagram schematically illustrating one example of the structure of first diffraction grating 3a according to the first exemplary embodiment. FIG. 7 illustrates the bottom view of diffraction element 3 illustrated in the lower section of FIG. 6 in more detail.

Figure 8:
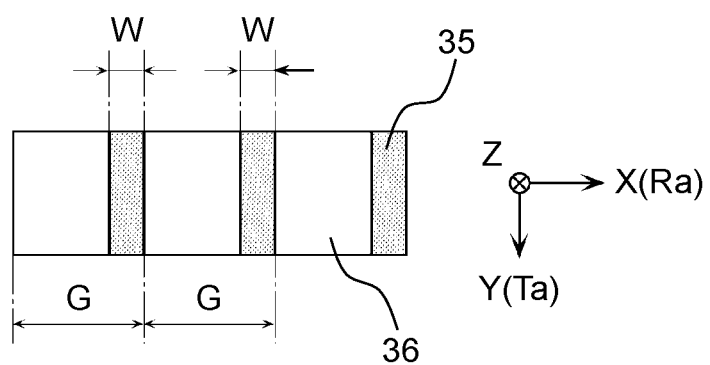
FIG. 8 is a diagram schematically illustrating one example of grating structure of the first diffraction grating according to the first exemplary embodiment.

FIG. 8 is a diagram schematically illustrating one example of grating structure of first diffraction grating 3a according to the first exemplary embodiment. FIG. 8 schematically illustrates partially enlarged grating structure of first diffraction grating 3a.

As illustrated in FIG. 7, in the first exemplary embodiment, first diffraction grating 3a includes first region 31, second regions 32, third regions 33, and fourth regions 34.

First region 31 is a region including a central portion of first diffraction grating 3a.

Second regions 32 are regions positioned on an outer edge side of first region 31 in the tangential direction, and are provided next to first region 31 so as to sandwich first region 31 in the tangential direction.

Third regions 33 are regions positioned on the outer edge side of second regions 32 in the tangential direction, and are provided next to second regions 32 so as to sandwich second regions 32 in the tangential direction.

Fourth regions 34 are regions positioned on the outer edge side of third regions 33 in the tangential direction, and are provided next to third regions 33 so as to sandwich third regions 33 in the tangential direction.

Here, as illustrated in FIG. 8, in first diffraction grating 3a, the grating is provided along the radial direction. That is, in first diffraction grating 3a, light-transmitting regions 36 and light-shielding regions 35 are alternately provided along the radial direction. It is to be noted that light-shielding regions 35 are formed of a light-shielding body such as a metal film made of chromium.

The duty of the grating in first diffraction grating 3a (rate of width of light-shielding region 35 to grating width of first diffraction grating 3a) is W/G. Here, G is the grating width (grating period) of first diffraction grating 3a, and W is width of light-shielding region 35. That is, the duty of the grating in first diffraction grating 3a is proportion of width W of light-shielding region 35 that accounts for grating width G of first diffraction grating 3a.

As described above, in first diffraction grating 3a, the duty of the grating becomes smaller from the central portion toward the outer edge. Specifically, the duty of the grating in second regions 32 is smaller than the duty of the grating in first region 31, and the duty of the grating in third regions 33 is smaller than the duty of the grating in second regions 32. Also, the duty of the grating in fourth regions 34 is smaller than the duty of the grating in third regions 33.

By passing through such first diffraction grating 3a, the intensity distribution of the laser beam is corrected.

FIG. 9 is a diagram illustrating one example of the correction of the intensity distribution of the laser beam according to the first exemplary embodiment. A figure in an upper section of FIG. 9 is a diagram illustrating a relationship between a laser deviation angle and intensity of the laser beam before passing through first diffraction grating 3a. A figure in a lower section of FIG. 9 is a diagram illustrating the relationship between the laser deviation angle and intensity of the laser beam after passing through first diffraction grating 3a.

In FIG. 9, a horizontal axis represents the laser deviation angle (unit: deg), whereas a vertical axis represents the intensity of the laser beam. It is to be noted that the vertical axis relatively represents the intensity of the laser beam with the intensity at a center of the laser beam before passing through first diffraction grating 3a being 1.0.

In first diffraction grating 3a, by the above-described structure, transmittance of 0th light becomes higher from the central portion toward the outer edge. That is, the transmittance of 0th light is low in the central portion and is high in the outer edge. Therefore, as illustrated in the figure in the lower section of FIG. 9, the intensity distribution of the laser beam that passes through first diffraction grating 3a approaches a flat state as compared with the intensity distribution of the laser beam before passing through first diffraction grating 3a. As a result, the intensity distribution of the laser beam that is incident on object lens 9 also approaches a flat state.

When the intensity distribution of the laser beam that is incident on object lens 9 approaches to be flat, a ratio of light intensity in the outer edge of object lens 9 (rim intensity) to light intensity of light in the central portion of object lens 9 becomes high. This allows reduction in the optical spot formed by object lens 9 on the optical disc.

Figure 10:
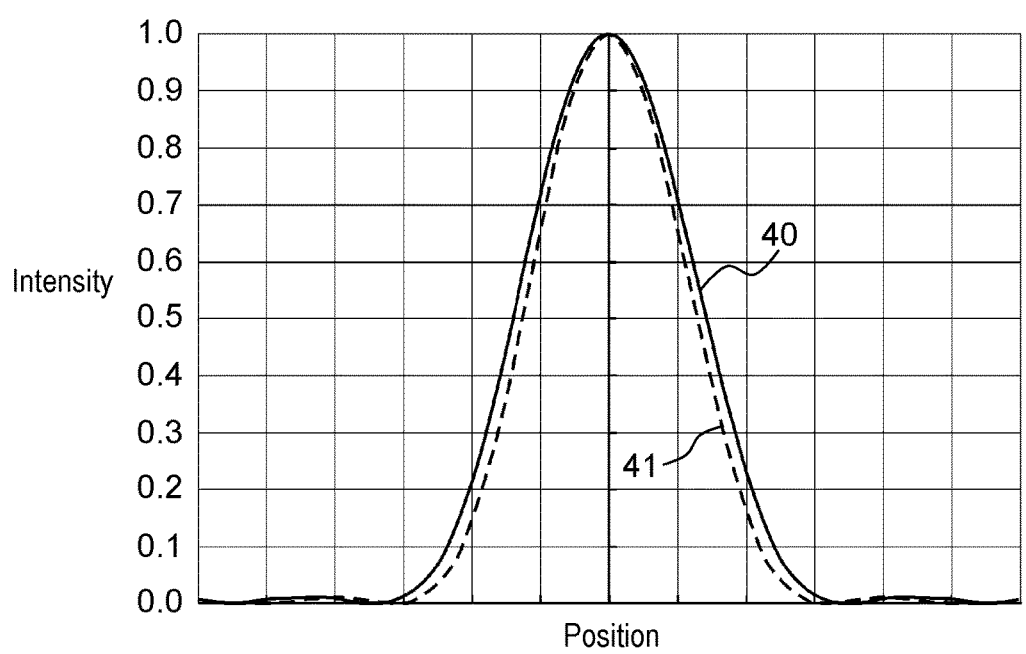
FIG. 10 is a diagram illustrating one example of the intensity distribution of an optical spot according to the first exemplary embodiment.

FIG. 10 is a diagram illustrating one example of the intensity distribution of the optical spot according to the first exemplary embodiment. In FIG. 10, a horizontal axis represents a relative position of the optical spot, whereas a vertical axis represents the intensity of the laser beam. It is to be noted that the center of the horizontal axis represents the center of the laser beam. Also, the vertical axis relatively represents the intensity of the laser beam with the intensity at the center of the laser beam being 1.0.

It is to be noted that in FIG. 10, graph 40 represents the intensity distribution of the optical spot when the laser beam does not pass through first diffraction grating 3a, whereas graph 41 represents the intensity distribution of the optical spot when the laser beam passes through first diffraction grating 3a.

As illustrated in FIG. 10, as compared with graph 40, graph 41 has narrow width. That is, the optical spot formed on optical disc 10 becomes relatively small because the laser beam passes through first diffraction grating 3a. This allows improvement in the playback performance of optical pickup device 20.

[1-6. Effects by Diffraction Element, Etc.]

As described above, in the present exemplary embodiment, the optical pickup device may further include a diffraction element provided on an optical path between the semiconductor laser and the object lens. The diffraction element may be provided with a first diffraction grating with duty of grating becoming smaller from a central portion toward an outer edge.

It is to be noted that diffraction element 3 is one example of the diffraction element. First diffraction grating 3a is one example of the first diffraction grating.

For example, in the configuration example of optical pickup device 20 described in the first exemplary embodiment, optical pickup device 20 includes diffraction element 3 provided on the optical path between semiconductor laser 1 and object lens 9. In addition, diffraction element 3 is provided with first diffraction grating 3a with the duty of the grating becoming smaller from the central portion toward the outer edge.

This allows optical pickup device 20 to relatively reduce the optical spot formed by the laser beam emitted from semiconductor laser 1 on optical disc 10. Therefore, even if optical disc 10 is a UHD BD with recording density per layer being relatively high, optical pickup device 20 allows improvement in the playback performance in optical disc 10.

It is to be noted that an aspect of first diffraction grating 3a described in the present exemplary embodiment is just one example, and the present disclosure is not limited to this structure at all. First diffraction grating 3a may be any aspect as long as the duty of the grating becomes smaller from the central portion toward the outer edge. For example, in first diffraction grating 3a, the grating may be provided along a direction that intersects both directions of the tangential direction and the radial direction.

In the optical pickup device, the first diffraction grating may be provided on a first principal plane of the diffraction element. A second principal plane of the diffraction element on an opposite side of the first principal plane may be provided with a second diffraction grating for dividing the laser beam into at least three beams and causing the divided beams to be incident on the object lens.

It is to be noted that the lower surface of diffraction element 3 is one example of the first principal plane. The upper surface of diffraction element 3 is one example of the second principal plane. Second diffraction grating 3b is one example of the second diffraction grating.

For example, in the configuration example of optical pickup device 20 described in the first exemplary embodiment, first diffraction grating 3a is provided on the first principal plane of diffraction element 3, and second diffraction grating 3b for dividing the laser beam emitted from semiconductor laser 1 into at least three beams and causing the divided laser beams to be incident on object lens 9 is provided on the second principal plane of diffraction element 3 on the opposite side of the first principal plane. That is, one diffraction element 3 is provided with two types of diffraction grating.

This allows optical pickup device 20 to decrease the number of components than in a case where the two types of diffraction grating of first diffraction grating 3a and second diffraction grating 3b are implemented as separate diffraction elements. Therefore, this enables achievement of simple manufacturing processes and cost reduction of optical pickup device 20.

In the optical pickup device, the diffraction element may be disposed so as to cause the laser beam to be incident on the first principal plane.

For example, in the configuration example of optical pickup device 20 described in the first exemplary embodiment, diffraction element 3 is disposed so as to cause the laser beam emitted from semiconductor laser 1 to be incident on the first principal plane. In other words, in optical pickup device 20, diffraction element 3 is disposed so as to cause first diffraction grating 3a disposed on the first principal plane of diffraction element 3 to face semiconductor laser 1, and to cause the laser beam from semiconductor laser 1 to be incident on first diffraction grating 3a.

This allows optical pickup device 20 to reduce stray light (unnecessary light) harmful to optical pickup device 20.

For example, when diffraction element 3 is disposed so as to cause the second principal plane on which second diffraction grating 3b is provided to face semiconductor laser 1, the correction of the intensity distribution is performed after the three beams are formed. In this case, when the laser beam passes through first diffraction grating 3a, the laser beam has already been expanded to the three beams. Accordingly, the stray light that is generated when the laser beams pass through the diffraction grating is likely to be diffused. Meanwhile, when diffraction element 3 is disposed so as to cause the first principal plane on which first diffraction grating 3a is provided to face semiconductor laser 1 as in optical pickup device 20, the laser beam is not expanded when passing through first diffraction grating 3a, enabling reduction in diffusion of the stray light.

In addition, since the laser beam emitted from semiconductor laser 1 is incident on first diffraction grating 3a before being expanded into three beams by second diffraction grating 3b, an area on which first diffraction grating 3a is installed can be relatively reduced. For example, as illustrated in FIG. 6, in diffraction element 3, the area of the region on which first diffraction grating 3a is provided is smaller than the area of the region on which second diffraction grating 3b is provided. This enables reduction in processing time when first diffraction grating 3a is formed during manufacturing of optical pickup device 20.

Second Exemplary Embodiment

[2-1. Configuration and Operation of Optical Drive Device]

The second exemplary embodiment describes optical drive device 50 including optical pickup device 20 described in the first exemplary embodiment.

Figure 11:
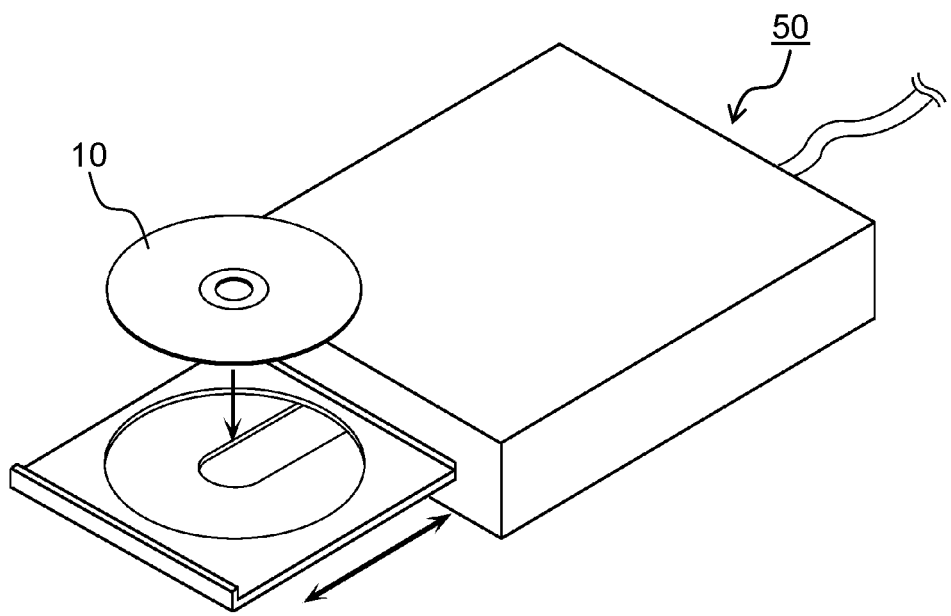
FIG. 11 is a perspective view schematically illustrating one example of external appearance of an optical drive device according to the second exemplary embodiment.

FIG. 11 is a perspective view schematically illustrating one example of external appearance of optical drive device 50 according to the second exemplary embodiment.

Figure 12:
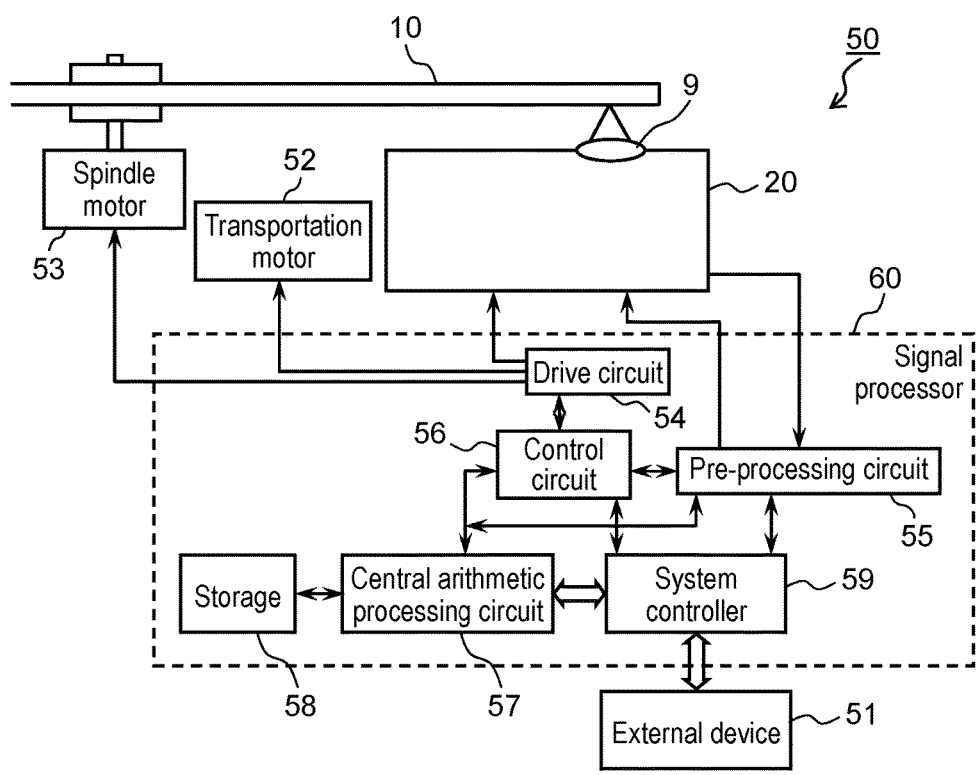
FIG. 12 is a block diagram schematically illustrating one example of a configuration of the optical drive device according to the second exemplary embodiment.

FIG. 12 is a block diagram schematically illustrating one example of a configuration of optical drive device 50 according to the second exemplary embodiment.

As illustrated in FIG. 12, optical drive device 50 includes optical pickup device 20 described in the first exemplary embodiment, signal processor 60, transportation motor 52, and spindle motor 53.

Optical pickup device 20 is as described in the first exemplary embodiment, and thus description thereof will be omitted.

Signal processor 60 includes pre-processing circuit 55, control circuit 56, drive circuit 54, system controller 59, central arithmetic processing circuit 57, and storage 58.

Pre-processing circuit 55 generates control signals, such as a focus error signal and a tracking error signal, an RF signal, and the like from an electric signal that is output from optical pickup device 20. Pre-processing circuit 55 then outputs the generated control signals and RF signal to control circuit 56.

Control circuit 56 performs control of light quantity of semiconductor laser 1 of optical pickup device 20, control of an unillustrated object lens drive device (actuator), and the like via drive circuit 54. It is to be noted that a series of control processes to be performed by control circuit 56 may be digital control.

Drive circuit 54 is one example of a drive unit that drives optical pickup device 20. Drive circuit 54 is connected to optical pickup device 20, transportation motor 52, and spindle motor 53. Drive circuit 54 drives optical pickup device 20 (for example, an actuator or the like), transportation motor 52, and spindle motor 53.

Transportation motor 52 is a motor for transporting optical pickup device 20 in a radial direction. Spindle motor 53 is a motor for controlling the number of rotations of optical disc 10.

System controller 59 performs digital signal processing on the control signals and RF signal generated by pre-processing circuit 55. In addition, system controller 59 outputs the processed signals to external device 51.

Central arithmetic processing circuit 57 is connected to pre-processing circuit 55 and control circuit 56, and controls the pre-processing circuit 55 and control circuit 56.

Signal processor 60 performs signal processing on the electric signal that is output from optical pickup device 20. Specifically, signal processor 60 drives optical pickup device 20 and reads unevenness of pits provided on an information recording surface of optical disc 10 as a digital signal. A program that prescribes such control is stored in storage 58 in advance as firmware, and is read by central arithmetic processing circuit 57 as appropriate. It is to be noted that storage 58 is specifically a nonvolatile memory.

[2-2. Advantageous Effects, Etc.]

As described above, in the present exemplary embodiment, an optical drive device includes an optical pickup device and a signal processor that performs signal processing on an electric signal that is output from the optical pickup device.

It is to be noted that optical drive device 50 is one example of optical drive device. Optical pickup device 20 described in the first exemplary embodiment is one example of the optical pickup device. Signal processor 60 is one example of the signal processor.

For example, in the configuration example of optical drive device 50 described in the second exemplary embodiment, optical drive device 50 includes optical pickup device 20 described in the first exemplary embodiment. Accordingly, in particular, when playing a triple-layer structure BD, optical drive device 50 has high playback performance in an L2 layer.

It is to be noted that optical drive device 50 is applicable to various devices.

Figure 13:
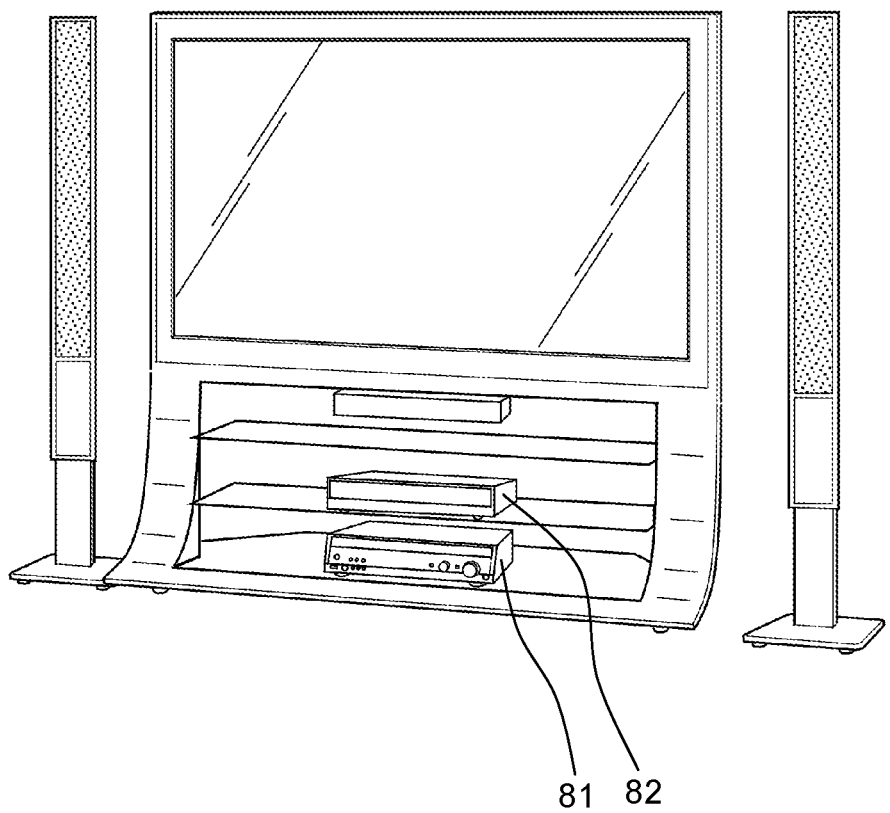
FIG. 13 is a diagram schematically illustrating an application example of the optical drive device according to the second exemplary embodiment.

FIG. 13 is a diagram schematically illustrating an application example of optical drive device 50 according to the second exemplary embodiment.

As illustrated in FIG. 13, optical drive device 50 may be incorporated in Blu-ray (registered trademark) player 81. Alternatively, optical drive device 50 may be incorporated in set top box 82. In addition, although not illustrated, optical drive device 50 may be incorporated in a personal computer, audio instrument, car navigation system, or the like.

Other Exemplary Embodiments

As described above, the first and second exemplary embodiments have been described as illustration of the technology to be disclosed in this application. However, the technology in the present disclosure is not limited to these exemplary embodiments, and is applicable to exemplary embodiments to which changes, replacements, additions, and omissions have been made. In addition, it is also possible to make a new exemplary embodiment by combining components described in the aforementioned first and second exemplary embodiments.

Therefore, other exemplary embodiments will be illustrated below.

For example, the optical configuration described in the first exemplary embodiment is one example. Optical pickup devices of other optical configurations that can implement characteristic functions of the technology in the present disclosure are also included in the technology in the present disclosure. In addition, the functional configuration of the optical drive device described in the second exemplary embodiment is also one example. Optical drive devices of other functional configurations that can implement the characteristic functions of the technology in the present disclosure are also included in the technology in the present disclosure.

For example, the first and second exemplary embodiments have described the examples in which the technology in the present disclosure is implemented as the optical pickup device and the optical drive device. However, the technology in the present disclosure may be implemented, for example, as the diffraction element (diffraction element 3) described in the first exemplary embodiment. In addition, as described in the second exemplary embodiment, the technology in the present disclosure may be implemented as a Blu-ray (registered trademark) player, set top box, personal computer, audio instrument, car navigation system, or the like.

As described above, the exemplary embodiments have been described as illustration of the technique in the present disclosure. For this purpose, the accompanying drawings and detailed description have been provided.

Accordingly, the components described in the accompanying drawings and detailed description may include not only components essential for solving problems but also components unessential for solving problems, in order to illustrate the technique. Therefore, it should not be acknowledged immediately that those unessential components be essential because those unessential components are described in the accompanying drawings and detailed description.

Also, since the aforementioned exemplary embodiments are intended to illustrate the technique in the present disclosure, various changes, replacements, additions, omissions, etc. may be made within the scope of the appended claims or equivalents thereof.

INDUSTRIAL APPLICABILITY

The present disclosure is applicable to the optical pickup device and the optical drive device capable of playing the optical disc that has triple-layer structure on which information is recorded with high density as UHD BD. Specifically, the present disclosure is applicable to a Blu-ray (registered trademark) player, set top box, personal computer, audio instrument, car navigation system, or the like.

REFERENCE MARKS IN THE DRAWINGS 1, 2: semiconductor laser
3, 14: diffraction element
3a: first diffraction grating
3b: second diffraction grating
4, 12: beam splitter
4a: separating plane
5: wave plate
6: collimator lens
7, 8: mirror
9, 11: object lens
10: optical disc
13: detection lens
15: light-receiving element
20: optical pickup device
31: first region
32: second region
33: third region
34: fourth region
35: light-shielding region
36: light-transmitting region
40, 41: graph
50: optical drive device
51: external device
52: transportation motor
53: spindle motor
54: drive circuit
55: pre-processing circuit
56: control circuit
57: central arithmetic processing circuit
58: storage
59: system controller
60: signal processor
81: Blu-ray (registered trademark) player
82: set top box

The invention claimed is:

1. An optical pickup device comprising:
a semiconductor laser that emits a laser beam; and
an object lens that concentrates the laser beam on an optical disc,
wherein an optical axis of the object lens is inclined with respect to an optical axis of the laser beam that is incident on the object lens so as to generate a flare caused by coma aberration on an entrance side in a forward direction of pits of the optical disc.

2. The optical pickup device according to claim 1, wherein an inclination angle of the optical axis of the object lens with respect to the optical axis of the laser beam that is incident on the object lens is between 0.02 deg and 0.38 deg inclusive.

3. The optical pickup device according to claim 1, further comprising a diffraction element provided on an optical path between the semiconductor laser and the object lens,
wherein the diffraction element is provided with a first diffraction grating with duty of grating becoming smaller from a central portion toward an outer edge.

4. The optical pickup device according to claim 3, wherein
the first diffraction grating is provided on a first principal plane of the diffraction element, and
a second diffraction grating for dividing the laser beam into at least three beams and causing the divided beams to be incident on the object lens is provided on a second principal plane of the diffraction element on an opposite side of the first principal plane.

5. The optical pickup device according to claim 4, wherein the diffraction element is disposed so as to cause the laser beam to be incident on the first principal plane.

6. An optical drive device comprising:
the optical pickup device according to claim 1; and
a signal processor that performs signal processing on an electric signal that is output from the optical pickup device.

* * * * *